United States Patent [19]

Hermansson

[11] Patent Number: 4,612,121

[45] Date of Patent: Sep. 16, 1986

[54] SEPARATION MATERIAL, METHODS OF PRODUCING A SEPARATION MATERIAL AND USE OF OROSOMUCOID, FUNCTIONAL ANALOGS THERETO OR DERIVATIVES OR FRAGMENTS THEREOF FOR SEPARATION PURPOSES

[75] Inventor: Jörgen L. E. Hermansson, Huddinge, Sweden

[73] Assignee: ChromTech AB, Huddinge, Sweden

[21] Appl. No.: 613,177

[22] Filed: May 23, 1984

[30] Foreign Application Priority Data

Jun. 8, 1983 [SE] Sweden .................................. 8303221
Dec. 19, 1983 [SE] Sweden .................................. 8307023

[51] Int. Cl.$^4$ .............................................. B01D 15/08
[52] U.S. Cl. ...................................... 210/635; 210/656
[58] Field of Search ......................... 210/635; 436/161

[56] References Cited

U.S. PATENT DOCUMENTS

| 4,312,727 | 1/1982 | Shainoff | 210/635 |
| 4,416,784 | 11/1983 | Nakao et al. | 210/635 |
| 4,431,544 | 2/1984 | Atkinson et al. | 210/635 |
| 4,464,165 | 8/1984 | Pollard, Jr. | 210/635 |

OTHER PUBLICATIONS

Glycoproteins by Gottschalk. E;sevier Pub. Co., New York, N.Y. 1972 pp. 565–586, 590, 591 and 596–599.
The Chemistry of Local Anaesthetic Agents: Classification of Blocking Agents, B. H. Takman, Br. F. Anaesth. (1975), 47, 183 pp. 184 to 190.
Specific Cell Adhesion to Immobilized Glycoproteins Demonstrated Using New Reagents for Protein and Glycoprotein Immobilization, The Journal of Biological Chemistry, vol. 258, No. 4, pp. 2340–2349.

Primary Examiner—John Adee
Attorney, Agent, or Firm—Fisher, Christen & Sabol

[57] ABSTRACT

The invention relates to the use of orosomucoid, functional analogs thereto or derivatives or fragments thereof to produce separation materials.

4 Claims, 8 Drawing Figures

FIG. 1
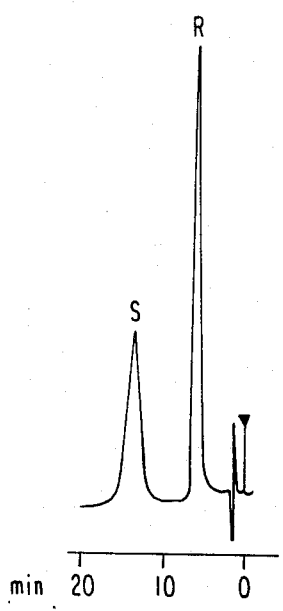
FIG. 2
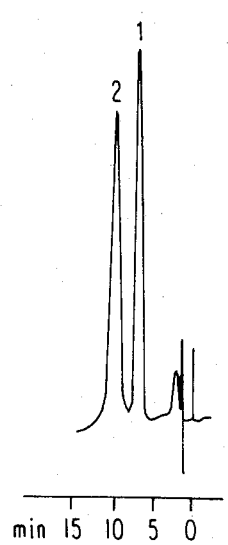
FIG. 3
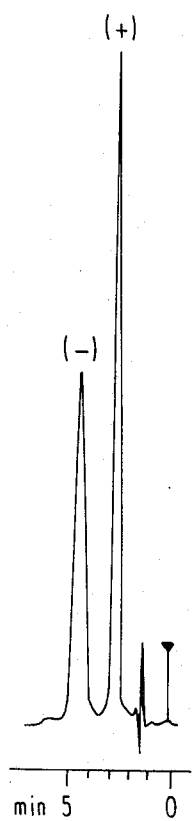
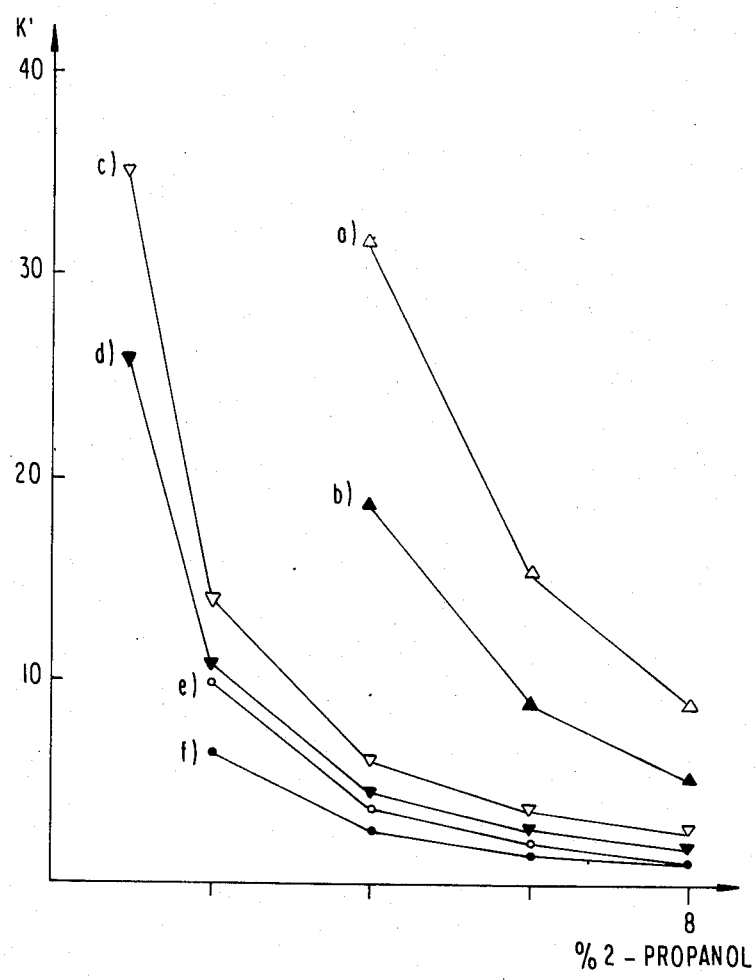
FIG. 4

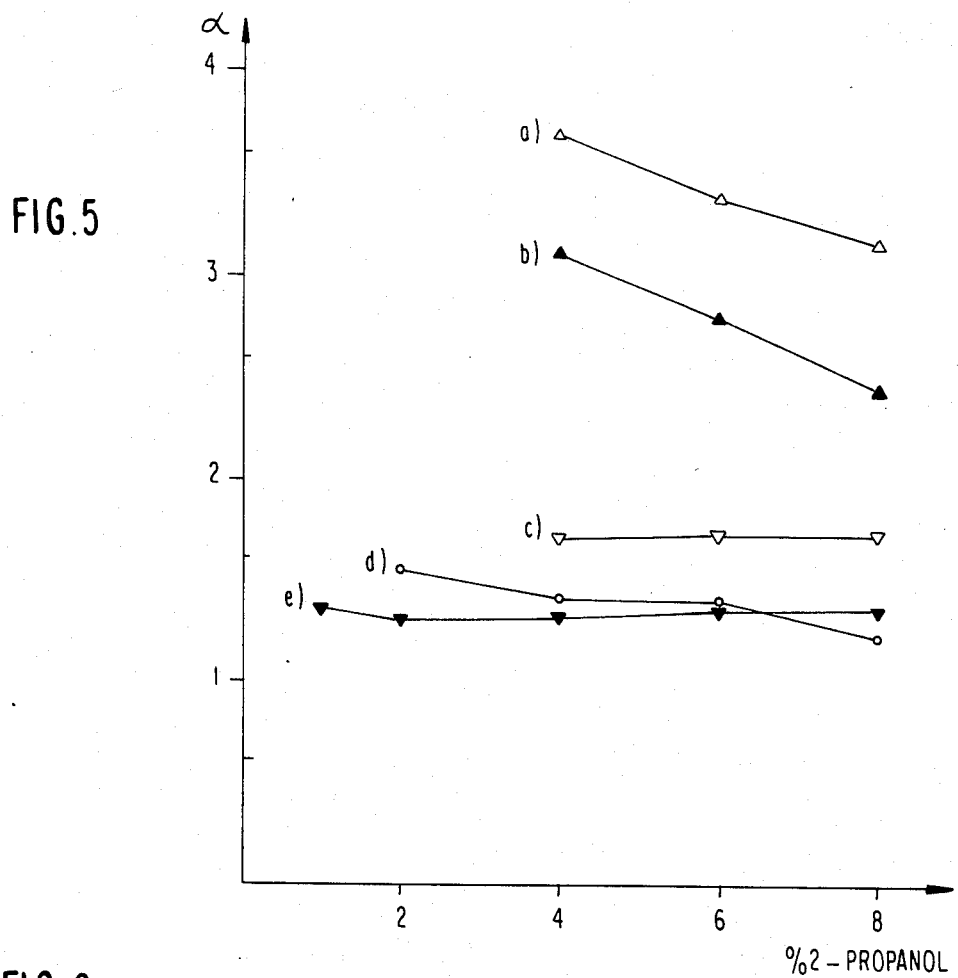
FIG.5
FIG.6
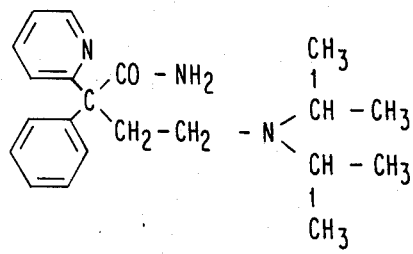
FIG.7
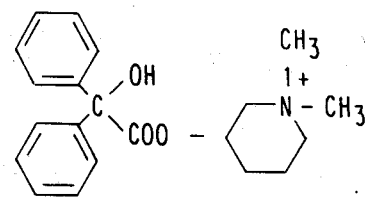
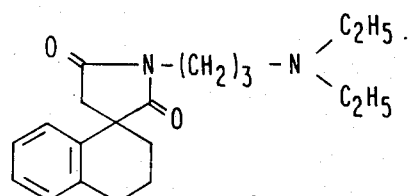
FIG.8

SEPARATION MATERIAL, METHODS OF PRODUCING A SEPARATION MATERIAL AND USE OF OROSOMUCOID, FUNCTIONAL ANALOGS THERETO OR DERIVATIVES OR FRAGMENTS THEREOF FOR SEPARATION PURPOSES

TECHNICAL FIELD

The present invention relates to a separation material, methods of producing a separation material and use of orosomucoid, functional analogs thereto or derivatives or fragments thereof for separation purposes.

BACKGROUND ART

For certain drugs whose molecules contain chiral, i.e. asymmetric carbon atoms it has been demonstrated that the therapeutic effect is tied to a certain enantiomer, i.e. an optical isomer. In such cases where the clinically used drug comprises either a racemate, i.e. equal parts of two enantiomers, or other mixtures of enantiomers of which only one of the enantiomers carries the clinically desired effect, the "inactive" form can contribute to side-effects without any corresponding therapeutic effect contributions. The use of only the "active" enantiomer results in therapeutical improvements for such drugs. In the development phase as well as in the production phase of drugs of the above character a technique is required which enables the separation of enantiomers in an analytical as well as in a preparative scale. In that the development of drugs goes towards a more selective therapy with the purpose to minimize the side-effects, a large part of the drugs registered today are strictly sterically defined, i.e. they contain only enantiomers with the desired pharmacological effect. This circumstance causes a strongly increasing need for separation methods for checking synthesis processes in the production of such drug substances and drug preparations. There is also an increasing need for methods that would enable determinations of the contents of enantiomers in body fluids such as plasma and urine. Such determinations can be used for pharmacokinetic characterization of enantiomers to evaluate whether therapeutical advantages can be obtained if only one enantiomer is administered.

Presently, the possibilities are limited for direct separation of enantiomers of racemic drug substances by means of liquid chromatography. The majority of the described methods deal with the resolution of racemic amino acids. Three principally different approaches are known for separating enantiomers:

The oldest method is an indirect method and is based on the reaction of a racemic substance with a pure enantiomer of another substance, wherein so called diastereomeric derivatives are formed. The diastereomers can then be separated on a non-chiral column. This technique is however time-consuming and can give rise to serious errors upon the determination of the optical purity of e.g. a drug substance due to racemizing of the used chiral reagent or due to the fact that the enantiomers react with different rates with the chiral reagent.

Chiral stationary phases have also been used for the separation of enantiomers. Such phases have been produced by immobilization of a chiral compound on to a solid phase. However, the majority of these phases exhibits an important limitation as concerns the usability for different types of chemical substances. For many of the phases it is, moreover, supposed that test substances are present in some form of derivatives in order to be able to use the method. This means that the preparative use of such methods are limited.

Enantiomers of preferentially amino acids have also been separated by addition of a chiral complexing agent to the mobile phase in a liquid chromatographic separation system. However, the addition of the complexing agent to the mobile phase makes the method unsuitable to use for preparative purposes. Moreover, the method is unfavourable from an economical point of view in view of the large amounts of the chiral complexing agent that are used.

DISCLOSURE OF INVENTION

The object of the present invention is to eliminate the disadvanges of the prior techniques and instead provide a technique for direct separation of enantiomers which technique can be applied to different types of substances (amines, acids and non protolytic compounds) without any preceding preparation of derivatives.

This is attained in that the material and the method according to the invention have obtained the characterizing features defined in the claims.

BRIEF DESCRIPTION OF DRAWING

The invention will be described more in detail below with reference to the attached drawing on which FIGS. 1-3 show, on the one hand, the chemical structural formulas for disopyramide, mepensolate bromide and RAC 109, respectively, and, on the other hand, chromatograms of the separations of the enantiomers of these drug substances, FIG. 4 shows the capacity factors for the enantiomers of a number of racemic drug substances as a function of the amount of 2-propanol in the mobile phase, FIG. 5 shows the separation factors for enantiomers of different drug substances as a function of 2-propanol in the mobile phase.

FIGS. 6 to 8 show the chemical structural formulas associated with FIGS. 1 to 3.

DETAILED DESCRIPTION

According to the invention it has been possible to immobilize the protein $\alpha_1$-acid glycoprotein, below called orosomucoid, on a carrier or solid phase and pack immobilized protein in a separation column to be used as a chiral phase for direct separation of enantiomers.

The orosomucoid comprises a peptide chain and a carbohydrate portion. The molecule comprises five carbohydrate parts. The carbohydrate portion constitutes 45% of the mass of the molecule. The terminal sugar in the carbohydrate chain comprises i.a. sialic acid which comprises alcoholic hydroxyl groups as well as an acidic function.

According to a first embodiment of the method according to the invention the orosomucoid is bound to a solid phase, e.g. silica microparticles by covalent coupling. The solid phase is first reacted with 3-glycidoxypropyltrimetoxysilane containing reactive epoxide groups. The epoxide activated solid phase is then reacted with the orosomucoid in a buffer of pH 8.5. The solid phase with the orosomucoid immobilized thereon is then packed in a column known per se, through which a mobile phase is pumped by means of a pump, e.g. a high pressure pump.

According to a second embodiment of the method according to the invention the alcoholic hydroxyl groups of the orosomucoid are oxidized to aldehyde groups by means of an oxidizing agent, e.g. metaperiodate salts. During the oxidation the molar ratio between the oxidized agent and the protein is 120. After the oxidation the metaperiodate salt excess is removed by addition of glycerol. Then the reaction mixture is gelfiltrated to remove the glycerol excess as well as reaction products of glycerol and the metaperiodate salt.

According to the invention the oxidized orosomucoid can then e.g. be adsorbed on a solid phase, e.g. positively charged porous silica microparticles. The adsorption is carried out at such a pH that the sialic acid and other acidic functions of the protein molecule are charged and attracted by the positive charges of the solid phase. According to the invention the pH of the reaction mixture is then raised. This will have two consequences, namely that amino groups in the peptide chain are transferred into uncharged form and that a cross-linking reaction is initiated at the same time between these amino groups and the aldehyde groups of the carbohydrate portion of adjacent molecules. The molecules are linked together into large, continuous chains which leads to that these large protein aggregates are anchored in the pores of the solid phase.

Upon reaction of aldehyde with primary amino groups Schiff bases are formed, which are reduced by addition of sodiumborohydride or some other reducing agent.

The immobilizing technique described has the great advantage compared with other techniques that it enables immobilization of a 5–10 times higher amount of protein per gram solid phase compared to the above first embodiment of the method according to the invention where the protein is covalently bonded to the solid phase. The high amount of protein leads to that large amounts of a racemic substance with low molecular weight can be resolved on a column containing a large amount of protein on the solid phase.

The solid phase with the orosomucoid immobilized thereon is then packed in a known steel column through which a mobile phase is pumped by means of a pump, most often a high pressure pump.

The material according to this invention makes it possible to separate enantiomers that one has not before been able to separate directly by means of column chromatography. The following racemic drugs can be mentioned as examples: disopyramide, mepensolate bromide, mepivacaine, bupivacaine, propiomazine and oxyphencyclimine and others.

FIG. 1 shows a chromatogram of the separation of the enantiomers of the antiarythmic drug disopyramide. The separation was carried out on a column with a length of 100 mm and a diameter of 3.0 mm packed with a chiral solid phase produced according to the second method described above. The column is eluted with phosphate buffer, pH 7.23 containing 8% (v/v) 2-propanol having a liquid flow of 0.5 ml/min.

FIGS. 2 and 3 show chromatograms of the separation of the enantiomers of the drug substances mepensolate bromide and RAC 109. The separation column used in FIGS. 2 and 3 is identical with the one used in FIG. 1. The column is eluted with phosphate buffer, pH 7.15 containing 2% 2-propanol and 0.98 mM dimethyloctylamine, and phosphate buffer, pH 7.20, containing 8% 2-propanol.

The advantage of the material according to the invention is its wide use, i.e. that the material according to the invention exhibits enantioselectivity for substances having very different properties (amines, amides and esters). The reason for this seems to be that the orosomucoid has many chiral sites, since it is a large molecule, a molecular weight of about 40 000, which is advantageous in comparison with chiral phases based on immobilisation of enantiomers of small molecules.

The separation column with the material according to the invention is suitably eluted with water based mobile phases of different pH. It has proved to be advantageous to work within a pH range of 6–8 which is in agreement with the physiological pH of blood where pH is about 7.4. It has been possible to control retention times, capacity factors and separation selectivity by either a simple pH adjustment of mobile phase or addition of low concentrations of alcohol to the mobile phase in the manner shown more in detail in FIGS. 4 and 5.

In FIG. 4 it is shown how the capacity factor, $k'$, proportional to the retention time for enantiomers of different drug substances varies with, the amount of 2-propanol of the mobile phase wherein curve a relates to (S)-bupivacaine, curve b relates to (R)-bupivacaine, curve c relates to (S)-mepivacaine curve d relates to (R)-mepivacaine curve e relates to mepensolate bromide II and curve f relates to mepensolate bromide I, where I and II are used to denote the enantiomers in those cases where pure enatiomers are not available. I denotes the enantiomer which is eluted first, i.e. the one that exhibits the lowest capacity factor, while II denotes the enantiomer that is eluted last in the chromatogram, i.e. the enantiomer with the highest capacity factor.

FIG. 5 shows the separation factor $\alpha$ as a function of the pH of the mobile phase for a number of substances wherein curve a relates to disopyramide, curve b relates to RAC 109, curve c relates to bupivacaine, curve d relates to mepensolate bromide and curve e relates to mepivacaine. The separation factor $\alpha$ is hereby defined as the capacity factor for the enantiomer with the highest capacity factor divided with the capacity factor for the enantiomer with the lowest capacity factor.

It is, of course, also possible to separate other substances than optical isomers by means of the material according to the invention.

EXAMPLE 1

The orosomucoid, functional analogs thereto or derivatives or fragments thereof are immobilized on a solid phase, e.g. silica microparticles, by covalent binding. The solid phase is packed in a column, applied to thin layer plates or used in a suspension for batch-separation of enantiomers. The column alternatively the thin layer plates are eluted with e.g. a water phase of given pH.

EXAMPLE 2

The orosomucoid, functional analogs thereto or derivatives or fragments thereof are dissolved in a buffer of known pH. The solution is adsorbed on a solid phase which is packed in a column, applied to thin layer plates or used in solution. A racemic test substance is distributed between the protein treated solid phase and a liquid mixture.

EXAMPLE 3

The orosomucoid, functional analogs thereto or derivatives or fragments thereof are dissovled in a buffer of known pH. A racemic substance is distributed between the water-based protein solution and at least one other liquid so that a liquid-based multi-phase system is formed, between which a racemic substance can be distributed. The method can be used in a batch process or carried out as a continuous extraction.

EXAMPLE 4

The orosomucoid is dissolved in a cold, +4° C., acetate buffer of pH 5. The metaperiodate salt, 120 mole metaperiodate/mole protein, and the protein is reacted for 1 h at +4° C. protected from light. Then, glycerol, 18–20 mole glycerol/mole metaperiodate, is added to the reaction mixture and reacted for ten minutes at room temperature.

The reaction mixture is gelfiltered on a column packed with SEPHADEX ® G-25 (fine), equilibrated with a 0.01 M acetate buffer, pH 5. The reaction mixture is applied on the column which is, then, eluted with 0.01 M acetate buffer, pH 5. Oxidized protein is collected and adsorbed at pH 5 on a carrier having a surface containing positive groups at the above stated pH. The positive groups can be a quarternary ammonium compound or a tertiary amine. The adsorption can be carried out in batch. Alternatively, oxidized protein can be pumped through a column containing a solid phase with positive charges.

After the adsorption pH of the solid phase is changed, either in that a 0.03 M borate buffer pH 9.2 is pumped through a column packed with a solid phase with adsorbed protein or, if the adsorption has taken place in batch, by carrying out the pH change in a filter funnel. The solid phase is reacted for 15–17 h at pH 9.2.

Then, the solid phase is suspended in a 0.1 M borate buffer pH 8.5 and reduced with a surplus of sodiumborohydride at room temperature for 1 h. The solid phase is washed with buffer pH 7 until the development of hydrogen gas has ceased.

EXAMPLE 5

The orosomucoid is adsorbed at pH 5 on a carrier with a surface containing positive groups at the above stated pH. The positive groups can be a quarternary ammonium compound or a tertiary amine. The adsorption can be carried out in batch. Alternatively, the protein can be pumped through a column containing a solid phase with positive charges.

I claim:

1. Method comprising chromatographically separating different substances by contacting said substance with $\alpha_1$-glycoprotein immobilized by covalent coupling on microparticles.

2. Method as claimed in claim 1 wherein enantiomers are separated.

3. Method comprising chromatographically separating different substances by contacting said substance with oxidized $\alpha_1$-acid glycoprotein immobilized by adsorption and crosslinking on microparticles.

4. Method as claimed in claim 3 wherein enantiomers are separated.